Jan. 14, 1958     E. G. PEEBLES     2,819,537
DRIFT INDICATOR
Filed April 30, 1954     2 Sheets-Sheet 1
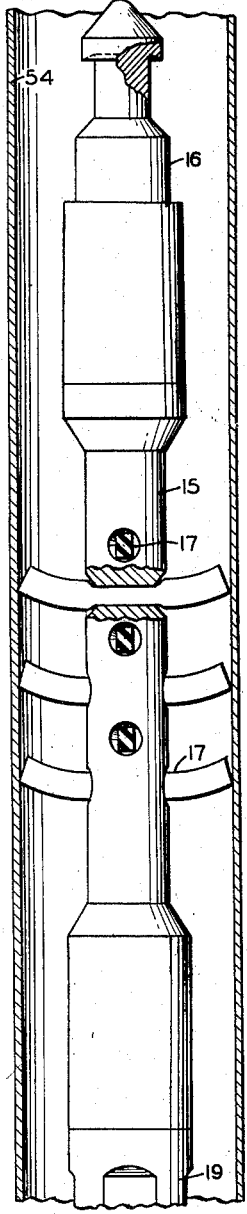
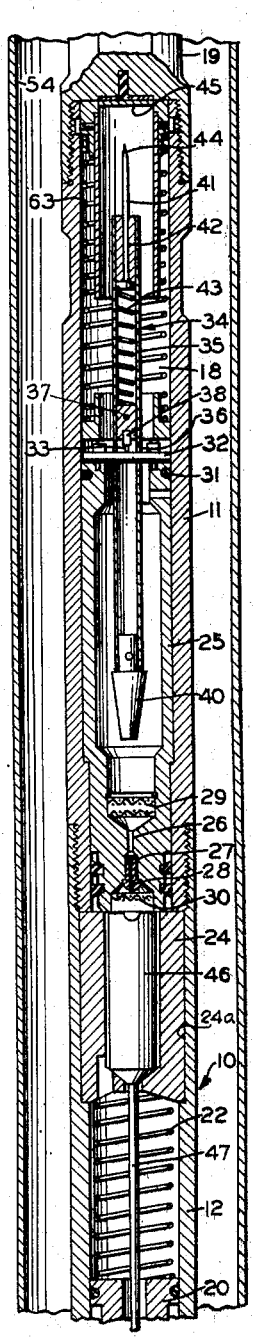
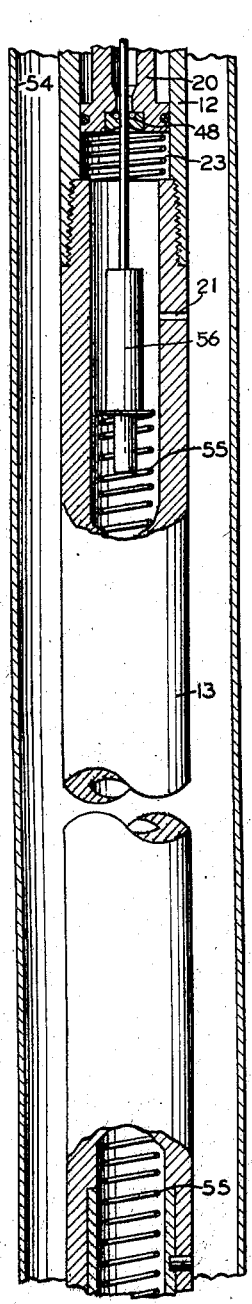
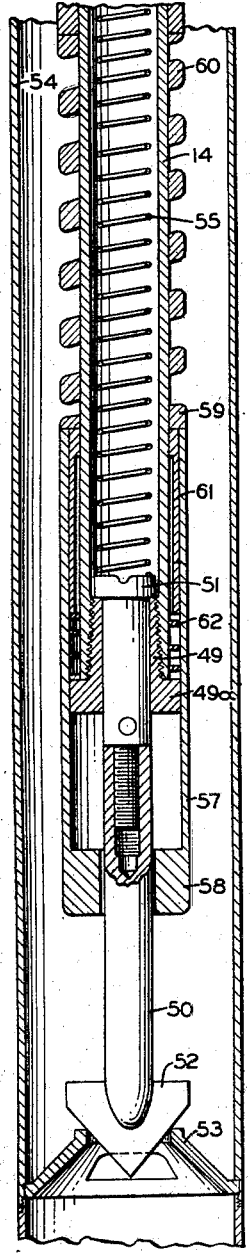
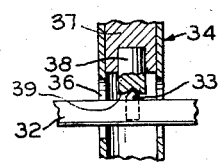
INVENTOR.
EDGAR G. PEEBLES
BY
Mellin and Hanscom
ATTORNEYS

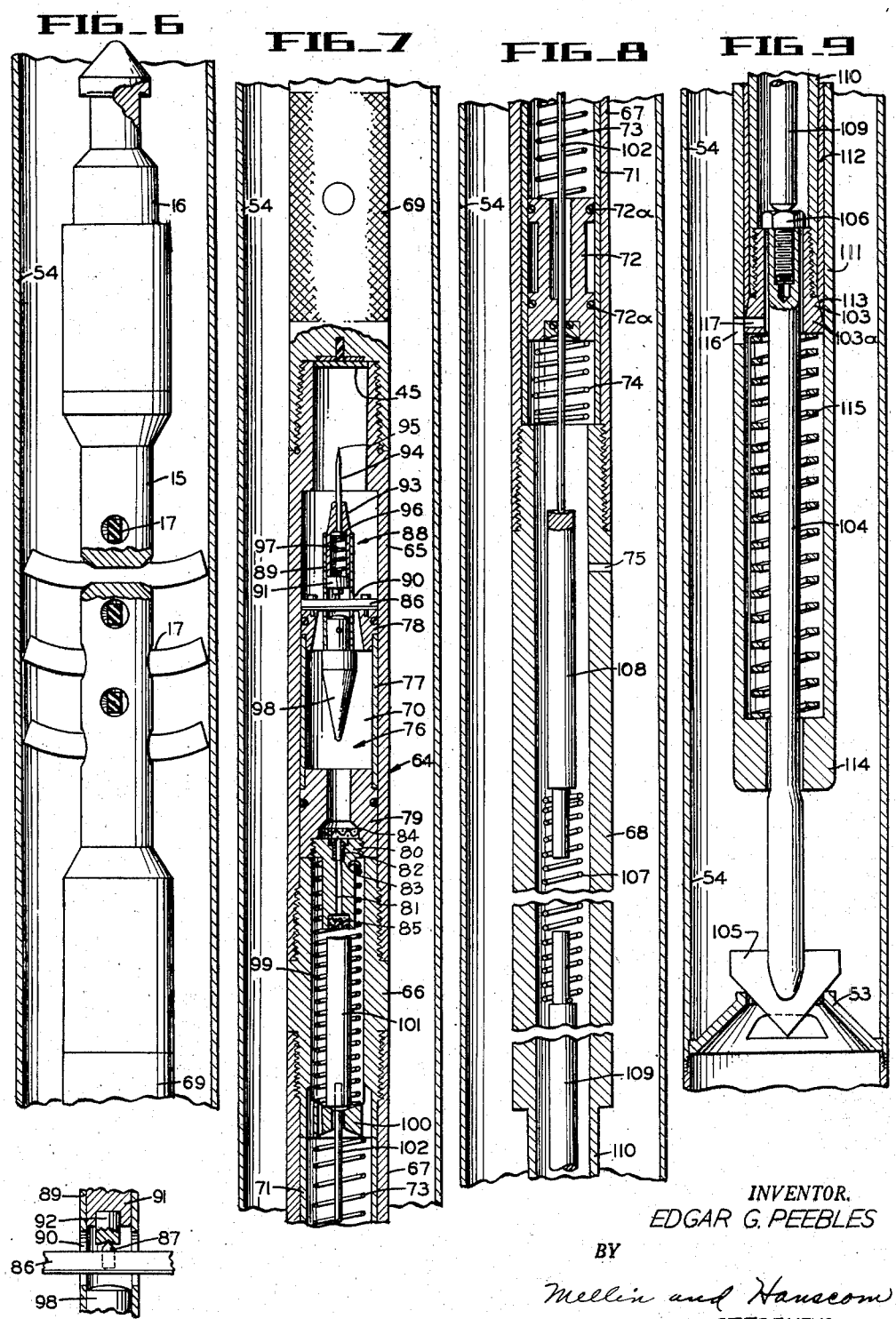

though provided above the passage 26 to prevent any

United States Patent Office 2,819,537
Patented Jan. 14, 1958

2,819,537
DRIFT INDICATOR

Edgar G. Peebles, Arcadia, Calif., assignor of one-fifth to Oscar O. Collins, Los Angeles, Calif.

Application April 30, 1954, Serial No. 426,697

3 Claims. (Cl. 33—205.5)

This invention relates generally to inclinometers, and more particularly to such devices which are known in the art as drift recorders and which are used to measure the deviation from the vertical of a well, or hole, drilled in the earth to a relatively great depth. The instant invention is generally similar to, and constitutes an improvement of, the drift indicator disclosed in my prior patent entitled "Pendulum Drift Indicator," No. 2,563,359, issued August 7, 1951.

In my prior patent there is disclosed a drift indicator capable of being dropped or lowered through a drill string and seating itself in alignment with the lower end thereof and marking on a chart the inclination of the tool when so seated. It has been found in practice that under certain conditions the tool will bounce on its seat and give unwarranted false multiple markings.

One object of the instant invention is to provide a drift indicator of improved construction which may be either dropped or lowered through a well string to seat adjacent the lower end thereof and to register a permanent record of the inclination of said tool when seated.

A second object of this invention is to provide a drift indicator wherein there is incorporated a dashpot arrangement to delay the recording of the instrument for a predetermined length of time after the seating of the tool.

Another object of the invention is to provide a drift indicator wherein the recording element is telescopically mounted to permit overtravel of the recording mechanism without damage to the recording element and to prevent multiple recordings due to bouncing of the tool, but permitting multiple recording under the control of the operator.

Still another object of this invention is to provide a drift indicator capable of being dropped through a well string with shock absorbing means to absorb the shock when said drift indicator seats within the well string.

Various other objects will be apparent in reading the following description taken in conjunction with the accompanying drawings, in which:

Figs. 1–4 represent a longitudinal section through a tool embodying the principles of my invention, Fig. 2 being a continuation of the lower end of Fig. 1, Fig. 3 a continuation of Fig. 2 and Fig. 4 a continuation of Fig. 3.

Fig. 5 is a fragmentary view showing the pendulum support.

Figs. 6–9 are similar views to Figs. 1–4 and illustrate a modified form of the invention.

Fig. 10 is a fragmentary view illustrating the pendulum support for the modification shown in Figs. 6–9.

Referring now to the drawings and particularly to Figs. 1 through 4 thereof, there is disclosed a tool having a housing generally indicated at 10 comprising sections 11 to 14. A stabilizing member 15 is threaded onto the upper end of the housing 10 and a retrieving spear 16 is threaded onto the upper end of the housing 10 and a retrieving spear 16 is threaded onto the upper end of the stabilizer 15. The stabilizer 15 is provided with a plurality of rubber rod-like stabilizing elements 17 extending radially outward therefrom at right angles to each other. The purpose of these stabilizing elements will be more fully explained later.

The two uppermost sections 11 and 12 of the housing 10 define an internal oil filled chamber 18. The top of said chamber is formed by a solid sub 19 interposed between the housing 10 and the stabilizer 15. The lower end of the chamber is defined by a pressure equalizing piston 20 slidably mounted in the housing section 12. A port 21 in the wall of the housing section 13 below the piston 20 permits the surrounding fluid to enter the tool below the piston 20, whereby the lower portion of the piston 20 is subjected to the ambient pressure and the upper end of the piston will act on the fluid in the chamber to automatically equalize the pressure therein.

A spring 22 within the housing acts downwardly against the upper surface of the piston 20, and a similar spring 23 acts upwardly against the lower end of the piston 20. The lower end of the spring 23 abuts the upper end of the housing section 13. The tension on the spring 23 is slightly greater than the tension on the spring 22, thereby causing the pressure within the chamber 18 to be slightly above that existing outside of the tool in order that if there should be any leakage around the piston 20, it will be outward rather than inward to prevent any well fluid from entering said chamber. A cylinder 24 of smaller internal diameter than the chamber 18 is mounted in a counterbore 24a in the upper end of the housing section 12 and divides the chamber 18 into two sections. The upper end of the spring 22 bears against the underside of the cylinder 24.

A cup-shaped piston 25 is slidably mounted in the upper section of the chamber 18 with its open end up. A passage 26 extends through the lower end of said cup-shaped piston 25 and a plug 27 having a restricted orifice 28 therethrough is threaded into the lower end of the passage 26. Suitable screens 29 and 30 are provided above and below the passage 26 to prevent any dirt particles from clogging the orifice. Suitable seals 31 are mounted on the exterior of the piston 25 and are in sliding engagement with the wall of the chamber 18 to prevent leakage of fluid around the outside of the piston.

A diametrically disposed rod member 32 is supported on the upper end of the piston 25. At the central portion of the diametrically disposed rod 32 there is provided an upwardly extending pin 33 terminating in a sharp point. A pendulum, generally indicated at 34, comprises a tubular element 35 having a slot 36 formed in its mid portion. A cylindrical plug 37 is rigidly mounted within said tubular member 35 immediately above the slot 36. A balancing bearing 38 is inserted in the lower end of the plug 37 and has a conical seat 39 ground in its lower surface. Said conical seat 39 rests upon the point formed on the upper end of the pin 33. A weight element 40 is fastened to the lower end of the tube 35. A marking element 41 in the form of a slender rod is slidably mounted in the upper end of the hollow cylinder 35 and is held therein by a cylindrical cap member 42 through which it extends. A spring 43 is confined between the upper end of the cylindrical plug 37 and the lower end of the pin 41 and urges the pin toward its outwardly extended position. The upper end of the pin 41 terminates in a sharp point 44, the purpose of which will presently become apparent. A recording blank 45 is adapted to be fastened to the lower surface of the sub 19 with the recording face thereof in opposed relation to the point 44 on the marking element 41. A relatively light spring 63 confined between the sub 19 and piston 25 normally urges the piston toward its lowermost position.

A plunger 46 is slidably mounted in the cylindrical element 24. The upper end of said plunger is adapted to abut the lower surface of the piston 25. A relatively slender rod 47 is fastened to the lower end of the plunger 46 and extends downwardly through the piston 20 into the housing section 13 below the oil filled chamber 18. Suitable sealing elements 48 are provided to prevent fluid from leaving the chamber 18 at the point where the rod 47 passes through the piston 20. A bushing 49 having a laterally extending flange 49a is threaded into the lower end of the lowermost housing section 14. A rod 50 extends through said bushing 49 and has a flanged upper end 51 for retaining said member within the bushing. A conical-shaped member 52 is fastened to the lower end of the rod 50 and is adapted to cooperate with a conical seat 53 mounted in the drill string 54 adjacent the lower end thereof. A plunger spring 55 is mounted within the housing sections 13 and 14 and is confined between the upper end of the rod 50 and a plunger spring head 56 which bears against the lower end of the plunger rod 47.

A sleeve 57 surrounds the flange 49a on the bushing 49 and is in sliding engagement therewith. The lower end of the sleeve 57 has an inwardly turned flange 58 in sliding relation with the rod 50. The flange 58 is spaced from the lower surface of the bushing flange 49a. The upper end of the sleeve 57 has an inwardly turned flange 59 in sliding relation with the outer surface of the lowermost housing section 14. A shock absorbing spring 60 surrounds the lower housing section 14 and is confined between the flange 59 and the lower surface of the housing section 13. A second sleeve-like member 61 is mounted within the sleeve 57 and is in sliding relation with the housing section 14. A shock absorber recoil spring 62 is confined between the lower end of the second sleeve 61 and the upwardly facing surface of the flange 49a on the bushing 49.

In operation of the preferred embodiment, the device is assembled in the relation shown in Figs. 1 and 2 of the drawings and is either lowered or dropped through the drill string 54. When the device reaches the lower end of the drill string, the member 52 seats in the conical seat 53 and the upper end of the tool is centralized by the rubber-like rods 17 bearing against the walls of the drill string 54. The weight of the housing 10 causes the housing to continue to travel downwardly relative to the rod 50 until the flange 58 contacts the upper end of the element 52. The shock of the device landing on the seat 53 is thus absorbed in the large shock absorber spring 60. The rod 50 has now been moved upwardly relative to the housing 10 and compresses the spring 55. The compression of spring 55 forces the rod 47 and the plunger 46 upwardly to force the piston 25 upwardly relative to the housing section 11, overcoming the pressure of spring 63. In order for the piston 25 to move upwardly, the fluid above said piston is forced to travel through orifice 28 and thus the movement of the piston 25 is retarded. When the piston 25 moves to its uppermost position, the point 44 of the recording element 41 will contact the recording blank 45 and thus record the inclination of the pendulum 34 relative to the housing 10. It will be appreciated that the travel of the piston 25 is greater than the distance between the point 44 and the record blank 45 and thus when the piston moves to its uppermost position, the recording element 41 is telescoped downwardly within the cylindrical pendulum 34.

If it is desired to make an additional reading in order to check to initial reading of the device, it is merely necessary to lower a retrieving tool to contact the spear 16 on the upper end of the tool and raise the tool from its seat 53 a time sufficient to allow the piston 25 to descend at its lowermost position under the influence of gravity and the spring 63. The time necessary for this action is approximately thirty seconds, the time being governed by the size of the orifice 28. In order to make the new reading, it is then merely necessary to again lower the tool and permit the element 52 to rest upon the seat 53. It will also be appreciated that the time of recording is delayed approximately thirty seconds due to the size of the orifice 28 and therefore an accidental recording will not be effected even if the instrument should bounce when it initially contacts the seat 53. Further, due to the telescopic action of the recording element 41 in the pendulum 34, if the instrument should be slightly raised and then again lowered, the instrument will not make a multiple recording unless the instrument has been raised for an appreciable length of time.

In the modification shown in Figs. 6 through 10, and referring particularly to Figs. 6 through 9, there is disclosed a housing 64 comprising sections 65 through 68. A sub 69 is threaded onto the upper end of the upper housing section 65 and, as in the previous modification, a stabilizer member 15 having stabilizing elements 17 is threaded onto the upper end of the sub 69, and a retrieving spear 16 is threaded onto the upper end of the stabilizing unit.

The three upper housing sections 65, 66 and 67 define an oil-filled chamber 70. The upper end of the chamber, as in the previous modification, is closed by the sub 69. The housing section 67 has a replaceable sleeve 71 inserted therein and held in place by abutting the lower end of the housing section 66 and the upper end of the housing section 68. As in the previous modification, a sliding piston 72 closes the lower end of the chamber 70. Suitable seals 72a are provided on the piston 72 to prevent leakage of fluid therearound. As in the previous modification, upper and lower springs 73 and 74, respectively, are provided to bias the piston 72 to an intermediate position. Again similar to the previous modification, the spring 74 is slightly stronger in tension than the spring 73, whereby the piston will be slightly biased upwardly. A port 75 is provided in the housing section 68 to permit the ambient well fluid pressure to be applied to the lower surface of the piston 72. Hence, it can be seen that the pressure in the oil-filled chamber 70 will be slightly greater than the ambient pressure.

Referring now to Fig. 7, a piston generally indicated at 76, comprising a sleeve member 77, having an annular upper member 78 fixed in its upper end and an annular lower member 79 fixed in its lower end, is slidably mounted in the housing section 65 within the oil-filled chamber 70. A plug 80 having a central passageway 81 therethrough is threaded into the lower end of the lower annular member 79 and an orifice plug 82, having a fixed orifie 83 therein, is threaded into the upper end of the passage 81. Suitable screens 84 and 85 are provided above and below the orifice to prevent the accumulation of dirt in the orifice.

A diametrically disposed cross member 86 is supported on the upper end of the upper annular member 78 and has fixed to its mid-point an upwardly extending pin 87. The upper end of the pin 87 is ground to a conical point. A pendulum, generally indicated at 88, comprises a tubular rod 89, having a slot 90 cut in its mid-portion. A plug 91 is fixed in the tubular member 89 immediately above the slot 90. A bearing plug 92 is inserted in the lower end of the plug 91 and the lower end of said bearing 92 has a conical seat ground therein which rests upon the conical point of the upwardly extending pin 87. A cylindrical plug 93 is fixedly mounted in the upper end of the tubular member 89 and a marking pin 94 is slidably mounted in the annular plug 93. The upper end of the marking pin is ground to a conical point 95 and the lower end of the marking pin has an enlarged head 96 which cooperates with the plug 93 to prevent the marking pin from sliding out of the plug. A spring 97 is confined between the head 96 of the marking pin and the upper end of the plug 91 in the tubular member, and thus urges the marking pin toward its outwardly extended position. A weight element 98 is fixedly mounted to the lower end of the tubular element 89. A tension spring 99 is fastened at one of its ends to the element 80 threaded into the lower end of the piston 76. The other end of the spring 99 is hooked around a spider 100 formed integrally with the lower end of the housing section 66, whereby the spring 99 urges the piston 76 to its lowermost position.

Referring again now to Figs. 6 through 9, a plunger 101 is mounted within the housing section 66 and is adapted to abut the lower end of the element 80 fastened to the lower end of the piston 76. A plunger rod 102 is fastened to the lower end of the plunger 101 and extends downwardly within the housing and through the slidable piston 72. Suitable sealing means are provided to prevent the leakage of fluid through the piston 72 at the point where the rod 102 passes therethrough.

A bushing 103 having a laterally extending flange 103a is threaded into the lower end of the lower housing section 68. An operating rod 104 extends through the bushing 103 and has formed on its lower end a conical-shaped head 105 adapted to cooperate with a seat 53 mounted in the drill string 54. A cap screw 106 is threaded into the upper end of the operating rod 104 to prevent the rod from sliding out of the bushing 103. A plunger spring 107 is mounted within the housing section 68. An upper plunger spring head 108 is fastened to the upper end of the spring 107 and abuts the lower end of the plunger rod 102. Similarly, a lower plunger spring head 109 is fastened to the lower end of the plunger spring 107 and abuts against the cap screw 106 threaded into the upper end of the operating rod 104.

Shock absorber means are also provided in this modified form and such shock absorber means comprise a reduced portion of the lower housing section 68 as indicated at 110. A shock absorber sleeve 111 surrounds the lower portion of the housing section 68 and is in sliding engagement with the laterally extending flange 103a at the bushing 103. An inner sleeve 112 is fixed within the upper end of the shock absorber sleeve 111, and it is formed at its lower end with an outwardly and downwardly tapered face 113 for cooperation with a complementary shaped face on the flange 103a of the bushing 103. The lower end of the sleeve 111 is provided with an inwardly turned flange 114 adapted to be in sliding engagement with the operating rod 104. A shock absorber spring 115 is confined between the lower face of the bushing 103 and the upper face of the flange 114. A lateral port 116 is provided in the sleeve 111 immediately below the lower end of the inner sleeve 112, whereby a dashpot action is obtained to cushion the recoil of the shock absorber mechanism. A hole 117 is drilled into bushing 103 so that a rod or similar tool may be inserted therein, through port 116, to hold the bushing in order that it may be screwed into the reduced portion 110 of the lower housing section 68.

The operation of the modification shown in Figs. 4, 5, and 6 is similar in every respect with the operation described in connection with the preferred embodiment.

From the foregoing description, it may be seen that I have provided a drift indicating mechanism which is capable of being lowered or dropped through a well string to seat in the lower end thereof in alignment therewith and that upon seating the mechanism is automatically actuated to produce an indication of the inclination of said well string after a delay of approximately thirty seconds. It may also be seen that slight raising and lowering of the indicating mechanism will not produce a multiple recording due to the over travel of the actuating piston. It is further evident that if the operator should desire to make a multiple recording, it is merely necessary for him to raise the instrument off of its seat for a period sufficient to permit the operating piston to return to its lowermost position.

Having thus described my invention, what I claim and desire to secure by Letters Patent is:

1. For use in a well string, a drift recording apparatus for measuring the inclination of said well string with which it is aligned and including a housing, an oil-filled chamber within the upper portion of said housing, pressure compensating means for said oil-filled chamber comprising a piston slidable in said housing forming the lower end of said oil-filled chamber, an orifice in said housing below said piston to expose the lower surface of said piston to the ambient well pressure, means exerting an upward force on said piston to produce a pressure in said oil-filled chamber greater than the ambient well pressure, a piston-like member slidably mounted in said oil-filled chamber, orifice means in said piston-like member connecting the area above said piston with the area below said piston whereby upward movement of said piston relative to said housing is retarded by the oil being forced to flow through said orifice, pendulous means within said housing and supported by said piston means, a recording element attached to the upper end of said pendulous means, a record blank mounted in said housing above said recording element, a first rod-like member slidably mounted in said housing and adapted to contact the lower end of said piston-like means, a second rod-like member slidably mounted in said housing and adapted to project outwardly from the lower end thereof, a compression spring between the lower end of the first-mentioned rod-like member and the upper end of the second-mentioned rod-like member, whereby when said instrument is dropped within a well string the projecting end of the second rod-like member is adapted to seat upon a suitable seat provided in the well string adjacent the lower end thereof and be forced upwardly thereby relative to said housing to compress the spring and urge the first rod-like member upwardly to move the piston-like means upwardly relative to said housing to bring said recording element into engagement with said record blank.

2. The combination as set forth in claim 1 wherein the recording element is slidably mounted in the upper end of said pendulous means, and a spring normally urging said recording element toward its extended position.

3. The combination as set forth in claim 2 in combination with a shock absorbing mechanism comprising a sleeve slidably mounted on the lower end of said housing, a collar on the lower end of said sleeve spaced from the lower end of said housing and surrounding the second rod-like member and adapted to be contacted by the lower end thereof as said rod-like member moves upwardly relative to said housing, and a compression spring surrounding the lower portion of said housing and confined between a downwardly facing abutment on said housing and the upper end of said sleeve.

References Cited in the file of this patent

UNITED STATES PATENTS

| 1,593,150 | Von Wurstemberger | July 20, 1926 |
| 1,911,997 | Gillespie | May 30, 1933 |
| 1,928,644 | Bunker | Oct. 3, 1933 |
| 1,930,832 | Wickersham et al. | Oct. 17, 1933 |
| 2,109,690 | Culbertson | Mar. 1, 1938 |
| 2,219,512 | Cooper et al. | Oct. 29, 1940 |
| 2,334,950 | Opocensky | Nov. 23, 1943 |
| 2,419,468 | Smith | Apr. 22, 1947 |
| 2,563,359 | Peebles | Aug. 7, 1951 |